United States Patent Office 3,152,385
Patented Oct. 13, 1964

3,152,385
CERAMIC TOOLS
William Maxwell Wheildon, Jr., Framingham Center, and George W. Barnes, Templeton, Mass., assignors to Norton Company, Worcester, Mass., a corporation of Massachusetts
Filed Nov. 7, 1961, Ser. No. 150,756
3 Claims. (Cl. 29—95)

This invention relates to improved ceramic tools for machining metals and non-metals.

Ceramic inserts have recently become more and more widely employed in machining operations. These tools have high heat and wear resistance and are able to cut the newer, harder to machine metals. Production costs in machining operations can be reduced substantially because of the faster rates of cutting possible with ceramic tools as opposed to conventional materials which have been used as cutting tools.

Exemplary of such cutting tools are those described in U.S. Patent 2,618,567 to Comstock. An improved ceramic tool and method of producing it are described in application Serial No. 113,997 of Whittemore, King and Logan, filed June 1, 1961. Aluminum oxide tooling to which this invention is applicable are those such as tool bits sold by Vascoloy-Ramet Corporation, Waukegan, Illinois, under the designation VR-97.

As indicated above, ceramic inserts have certain advantages in machine cutting of certain materials such as hard to machine metals—e.g. metals which heretofore had to be ground because of the lack of a suitable cutting tool material. Ceramic tools are, for example, usable at cutting speeds of 1000 to 2000 surface feet per minute whereas carbide tools are generally limited to speeds up to 1000 surface feet per minute. Although having higher heat and wear resistance than carbide cutting elements, ceramic inserts or cutting tools are more brittle and shock sensitive than the conventional materials (such as cemented carbides).

It is therefore an object of this invention to improve the stock resistance and lasting qualities of ceramic cutting elements.

It has been found that by carefully controlling the geometry of ceramic inserts an improved cutting tool having much greater durability at no sacrifice in cutting characteristics is achieved.

In particular it has been found that if the cutting edges of these tool elements are provided with a convex land, having a small radius of curvature, a greatly improved result is achieved in terms of durability of ruggedness of the element.

It has also been found that a radius of the desired character may be produced by a tumbling operation. Tumbling not only produces the precise convex land which improves the cutting characteristics of the tool, but also is an efficient way of producing such a result.

Figure 1:
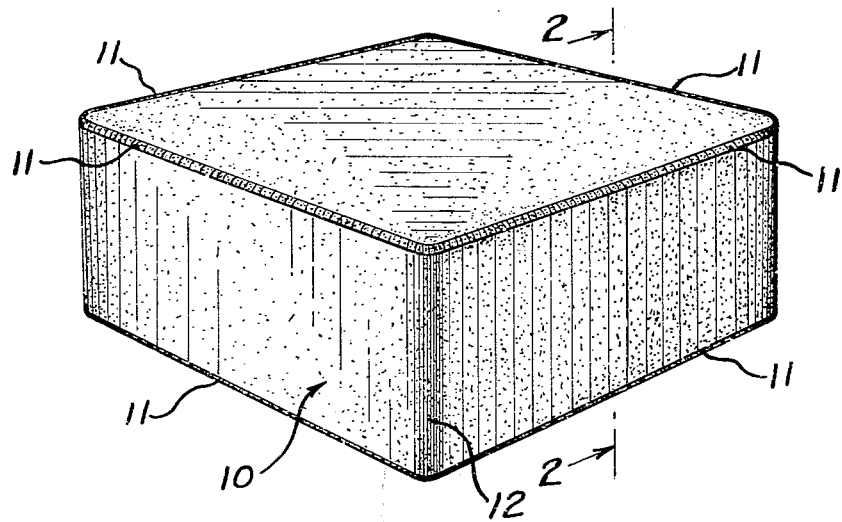
Figure 2:
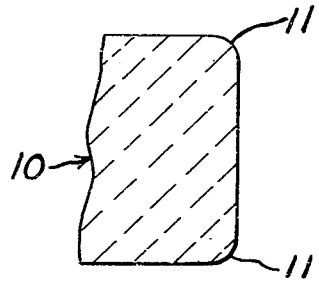

The invention will now be described in greater detail with reference to the accompanying drawing in which FIGURE 1 is an enlarged view of a ceramic tool insert according to our invention, and FIGURE 2 is a partial section taken in the direction 2—2 indicated in FIGURE 1.

The shape of the element 10 shown in FIGURE 1 is arbitrarily chosen since the tools may be cylindrical, triangular, square or diamond shaped or some irregular shape as desired. Other shapes than those listed may of course be employed depending upon the holder in which the insert is positioned and upon the particular job for which the tool is to be employed.

The cutting edges of the tool 10 are provided with a convex land 11 having a radius of curvature of from less than .002" to .012", as is more clearly shown in FIGURE 2.

The manufacture of the tools of this invention, the starting material, which is alumina which may contain additives such as magnesia to control crystal growth and/or small amounts of other additives to modify the physical characteristics of the product, is molded by a hot pressing technique such as taught in the patent to Ballard, No. 2,538,959, or in the copending application Serial No. 113,997 of Whittemore, King and Logan. After molding, the article is ground to the proper shape. After grinding, the cutting edges where planes of the tool meet are sharp edges. Prior practice required that a 30° to 60° flat land be honed on such edges to prevent chipping of the tool. Such an operation was ordinarily performed by hand honing.

It has been discovered that instead of a sharp cutting edge and instead of a chamfered edge, a "dull" convex edge having a radius of curvature of from less than .002" to .012" produces best results for a ceramic cutting tool. Although theoretically it is possible to produce such an edge by precise grinding of the tool, the best and most efficient method of producing the convex land is by a tumbling operation.

Tumbling, for the purposes of this invention, may be defined as an abrading process where the work to be abraded is in more or less random motion in contact with loose abrasive particles. The operation is conventionally performed (and may for the purposes of this invention be performed) by placing a large number of the articles to be finished in a revolving barrel with a charge of abrasive grains and balls or blocks of various materials. The desired results are obtained by adjusting the many variables such as type, size, and speed of the barrel, kind and size of abrasive, load in the barrel, length of time tumbled, etc.

Instead of a drum simply rotating on its own axis, a more complex rotation in which the drum rotates on a mandrel in a direction opposite to its axial rotation may be employed. Such tumbling equipment is sold under the trademark Harperizer and may be purchased from the Harper Buffing Machine Company, East Hampton, Connecticut.

Instead of rotational tumbling vibrational tumbling may be employed in attaining the desired geometry on the cutting tools. In such an operation the container may be either a tub machine (U shaped) or a horizontal octagonal container. The action is a constant movement of the entire mass of abrasive, workpieces, compound, and liquid. The vibration frequency usually ranges from 900 to 3600 vibrations per minute.

An example of the formation of convex edge lands, and control of the radii is as follows.

| Tumbling time (hours): | Cutting edge radius |
|---|---|
| 12 | .002 |
| 15 | .0025–.003 |
| 36 | .004–.0045 |
| 90 | .008 |

Tumbling media used were as follows:
25 pounds random shaped 8 grit size aluminum oxide grains;
1 pound 120 grit size silicon carbide grains;
1 quart of water.

The tumbling media and the ceramic tools were placed in a standard 6" long 12" diameter octagonal barrel on a horizontal shaft which was rotated at 6 to 8 revolutions per minute.

The particular geometry of the ceramic insert will vary with the material to be cut and the rate of cut. The tool illustrated in FIGURE 1 may have cutting edge lands having radii of between .002" or less and .012", as previously indicated to be the desirable range of radii for the cutting edges, and a nose radius 12 of 1/16". The nose radius is not critical and, in the case of a disc shaped insert, there will of course be no nose radius.

In tests on both hard or soft steels ceramic tool bits having tumbled edge lands were found to last on the average from 2 to 6 times as long as ceramic tools bits having a flat land ground on the cutting edge.

What is claimed is:

1. A method of improving the shock resistance and chip resistance of ceramic cutting tools comprising forming a convex land on the cutting edges of said tools by tumbling with loose abrasive particles.

2. A ceramic cutting tool having at least one cutting edge thereon, said edge having a convex land thereon formed by tumbling with loose abrasive particles and having a radius of curvature of from .002" to .012".

3. A method of producing a convex land on the edge of a brittle cutting tool comprising tumbling the tool with loose abrasive particles for a period of from 12 to 90 hours.

References Cited in the file of this patent

UNITED STATES PATENTS

| | | |
|---|---|---|
| 2,070,156 | De Bats | Feb. 9, 1937 |
| 2,130,684 | Hintermeyer | Sept. 20, 1938 |
| 2,831,240 | Maurer | Apr. 22, 1958 |
| 2,979,805 | Johnson | Apr. 18, 1961 |
| 3,078,546 | Kiernan | Feb. 26, 1963 |